US012490094B2

(12) United States Patent
Fontaine et al.

(10) Patent No.: US 12,490,094 B2
(45) Date of Patent: Dec. 2, 2025

(54) METHOD AND DEVICE FOR SECURELY CONNECTING TO A LOCAL AREA NETWORK

(71) Applicant: ORANGE, Issy-les-Moulineaux (FR)

(72) Inventors: Fabrice Fontaine, Chatillon (FR); Xavier Le Guillou, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 230 days.

(21) Appl. No.: 18/455,131

(22) Filed: Aug. 24, 2023

(65) Prior Publication Data

US 2024/0080667 A1    Mar. 7, 2024

(30) Foreign Application Priority Data

Aug. 25, 2022  (FR) ...................................... 2208514

(51) Int. Cl.
*H04W 12/08* (2021.01)
*H04W 12/12* (2021.01)
*H04W 76/11* (2018.01)

(52) U.S. Cl.
CPC ........... *H04W 12/08* (2013.01); *H04W 12/12* (2013.01); *H04W 76/11* (2018.02)

(58) Field of Classification Search
CPC ............. H04L 63/0407; H04L 63/0414; H04L 63/1441; H04L 63/1466; H04L 61/5046; H04L 61/5092; H04W 12/08; H04W 12/12; H04W 12/122; H04W 76/11
See application file for complete search history.

(56) References Cited

U.S. PATENT DOCUMENTS

| | | | | |
|---|---|---|---|---|
| 7,376,864 B1* | 5/2008 | Hu | ........................ | G06F 11/366 714/25 |
| 11,765,127 B1* | 9/2023 | Bahm | ................. | H04L 61/5007 709/245 |
| 2004/0258007 A1* | 12/2004 | Nam | ................... | H04L 61/5046 370/310 |
| 2006/0120317 A1* | 6/2006 | Zheng | ................. | H04L 61/5046 370/465 |
| 2011/0058482 A1* | 3/2011 | Nomura | .................. | H04L 43/04 370/392 |
| 2013/0139263 A1* | 5/2013 | Beyah | ................. | H04L 63/1408 726/23 |

(Continued)

OTHER PUBLICATIONS

Bolla et al., "Assessing the Potential for Saving Energy by Impersonating Idle Networked Devices" [Online], May 2016[Retrieved on: Jun. 14, 2025], IEEE Journal on Selected Areas in Comms. V.34 No. 5, Retrieved from: < https://ieeexplore.ieee.org/stamp/stamp.jsp?tp=&arnumber=7438740 > (Year: 2016).*

(Continued)

*Primary Examiner* — Eric W Shepperd
(74) *Attorney, Agent, or Firm* — David D. Brush; Westman, Champlin & Koehler, P.A.

(57) ABSTRACT

A method, a device and a system for secure connection. The method is implemented by a first terminal of a network administered by an access point. The terminal has a first address, called own address. The method includes: acquiring a set of data, called status data, including at least one address of at least one second terminal known to the network; and connecting to the network using the address of the second terminal as a replacement for the own address.

9 Claims, 3 Drawing Sheets

(56) References Cited

U.S. PATENT DOCUMENTS

| | | | |
|---|---|---|---|
| 2016/0150413 A1* | 5/2016 | Meredith | H04W 12/06 |
| | | | 455/410 |
| 2016/0226892 A1* | 8/2016 | Sen | H04W 12/02 |
| 2019/0036954 A1* | 1/2019 | Garcia | H04L 63/20 |
| 2019/0297051 A1* | 9/2019 | Stephenson | H04W 76/11 |

OTHER PUBLICATIONS

French Search Report and Written Opinion dated Mar. 16, 2023 for corresponding French Application No. 2208514, filed Aug. 25, 2022.

Ming et al., "Protecting Location Privacy with Dynamic Mac Address Exchanging in Wireless Networks", Nov. 30, 2007 (Nov. 30, 2007), XP093031463.

Arana O. et al., "MSP: Providing location privacy in WLAN networks with a MAC Swapping Protocol", Computer Networks, vol. 138, Jun. 1, 2018 (Jun. 1, 2018), pp. 136-148, XP093031542.

Debi Prasad Mishra et al., "Designing a Secure Network Interface by Thwarting Mac Spoofing Attacks", Information and Communication Technology for Competitive Strategies, ACM, 2 Penn Plaza, Suite 701 New York NY 10121-0701 USA, Mar. 4, 2016 (Mar. 4, 2016), pp. 1-6, XP058267459.

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications, in ANSI/IEEE Std 802.11, 1999 Edition (R2003), vol. No., pp. i-513, subsections 4.5.4.3, 9.3.3.12, 9.3.13, and 9.3.3.14, (2003), doi: 10.1109/IEEESTD.2003.95617.

\* cited by examiner

METHOD AND DEVICE FOR SECURELY CONNECTING TO A LOCAL AREA NETWORK

FIELD OF THE DISCLOSURE

The disclosure relates to the general field of telecommunications. More specifically, it relates to the security of a terminal of a local area network against an attack that would allow an unauthorized terminal to gain fraudulent access thereto.

BACKGROUND

Radio technologies, notably Wi-Fi technologies, are increasingly used within a local area network, whether this is a home or business network. These technologies allow smartphones, cameras, drones, sensors and even all sorts of terminals grouped together under the acronym IoT (Internet Of Things) to be connected. Although these technologies have many advantages, they also have weaknesses associated with the very nature of the transmission medium. Thus, any individual within radio range is capable of receiving the radio data exchanged by this equipment (even if it is encrypted). In particular, any pirate terminal can maliciously use the radio channel to detect nearby Wi-Fi access points, to acquire the addresses and the list of terminals connected to each access point and, finally, to send malicious radio packets in order to harm an object, for example, by disconnecting it from its access point (to this end, it can use an attack that is well known to a person skilled in the art, known as a "deauth flood") or by using a type of attack that would allow it to decrypt the packets intended for the object (such a type of vulnerability is also well known to a person skilled in the art under the acronyms Krack or Kr00k).

It is also possible, by analyzing the address of a terminal, to determine its type. Indeed, the first few characters of this address, of the Media Access Control (MAC) type, for example, often identify the manufacturer, or constructor, of the terminal. This data can be used to plan a theft or to identify specific vulnerabilities of certain terminals. For example, if the attacker detects that the terminal originates from a camera manufacturer, they can attempt to recover the images from the camera, or to disconnect it, etc.

A solution for limiting such attacks is known. It is known to randomize the address, and notably the MAC address, of a terminal in order to protect privacy. Thus, currently, a smartphone can use different addresses depending on the Wi-Fi network to which it is connected. Work is ongoing within the Wi-Fi Alliance organization that aims to allow terminals to regularly change their address. For example, Apple® is proposing changing the MAC address every 24 hours on its most recent terminals.

However, even this last solution has a security flaw: a malicious terminal can intercept the address of an object on the network, even if the time range for maintaining the address is limited.

Furthermore, such a solution involves modifying the software (firmware) of the Wi-Fi cards of the terminals, which is complex and costly.

Therefore, a need exists for a simple solution that avoids a security flaw allowing a malicious terminal to recover the address of the terminals of a local area network in order to harm them.

SUMMARY

An exemplary embodiment of the present disclosure relates to a secure connection method implemented by a first terminal of a network administered by an access point, the first terminal comprising a first address, called own address, the method comprising steps of:
- acquiring a set of data, called status data, comprising at least one address of at least one second terminal known to the network;
- connecting to the network using said address of said second terminal as a replacement for the own address.

Advantageously, an address, for example, a MAC address, of another terminal is used instead of the own MAC address of the terminal seeking to connect to the network. Thus, the risk of an attack against this terminal is significantly reduced, since, on the one hand, the MAC address is made dynamic (it is possible to change it upon each connection), and, on the other hand, the MAC address of the terminal that was "borrowed" does not correspond to the actual type of terminal, which confuses an attacker: thus, a terminal (for example, a camera) with its own address, which would allow its features to be identified (manufacturer, type, etc.), will be protected by connecting to the network via this new address borrowed from another terminal (for example, a connected bulb): the attacker will not be able to target their attack against a camera (for example, change the viewing angle of the camera, or seize data corresponding to photographs of the home), since they believe they are dealing with a connected bulb. This subterfuge makes targeting impossible.

The term "access point" is understood herein to mean any routing element capable of creating a local area network, for example a Wi-Fi network: gateway, mobile terminal set up as a hotspot, router, etc. Hereafter, this element is called gateway and denotes the access point of a local area network.

The term "own address" is understood to mean the address of the terminal, which can correspond to the address it was assigned by the manufacturer, which is generally unique, or to an address selected by the network user.

The term "status data" is understood to mean a set of data comprising, for at least one terminal of the network, at least one address, for example its MAC address, and optionally other data, such as the type, manufacturer, etc., of the terminal.

The term "connection" to the gateway is understood to mean any method within the scope of a person skilled in the art, for example pairing (Wi-Fi, Bluetooth, etc.), which authorizes subsequent communication by the terminal connected to the network. Naturally, once the first terminal has been connected with the borrowed address, it continues to use this address for communication.

A terminal that is "known" to the network is understood to mean a terminal that has connected to the gateway of the local area network at least once. It is therefore "known" to the gateway, at least of the network, irrespective of its current status: it can be actually connected to the gateway, or disconnected.

According to one embodiment, the step of acquiring the status data comprises the sub-steps of:
- receiving a message from or to said at least one second terminal of the network comprising said address of the second terminal;
- storing said address of said at least one second terminal in the status data, and the method further comprises a step of detecting inactivity of said at least one second terminal before connecting.

Advantageously, according to this embodiment, the status data is gathered by the terminal itself. Upon receiving a message from or to a terminal of the network, it extracts its address and stores it in the status data. If it is the MAC address, this can be extracted even if the message is encrypted, since the MAC address is not usually encrypted. When the terminal with the stored address disconnects from the network, either implicitly or explicitly, the first terminal detects its inactivity and can appropriate its address without adversely affecting the terminal whose address it usurped, since said terminal is no longer connected. The first terminal can thus build a list of active terminals on the network, with their addresses, and detect the inactivity of one of them.

The term "inactivity" is understood to mean that the terminal no longer communicates over the network. This inactivity can be detected by a lack of communication for a certain period of time, or by an explicit disconnection of the terminal, or by a disconnection order originating from the access point, etc.

According to one embodiment, the status data further comprises the reception date of the message from or to said at least one second terminal, and the inactivity of said at least one second terminal is detected as a function of said reception date.

Advantageously, according to this embodiment, the reception date of a message by the first terminal, for example the last one that it received from the second terminal, allows a timer to be set, at the end of which, in the absence of a received message, the second terminal can be considered to be inactive (for example, after thirty minutes).

According to one embodiment, the step of acquiring the status data comprises a step of receiving a message comprising status data originating from a third terminal of the network.

Advantageously, according to this embodiment, the status data is gathered by a third terminal, different from the first terminal that prepares its connection. In particular, the access point, or gateway, can be used for this purpose. Thus, the first terminal no longer has to be concerned with knowing whether or not the second terminal whose address it wishes to borrow is connected, with this management being left to the network gateway, for example, which is aware of all the terminals on the network at a given time and of their connection status.

According to one embodiment, the status data further comprises a priority associated with said address of said at least one second terminal.

Advantageously, according to this embodiment, since a priority is associated with the various terminals, it is simpler and more effective for the first terminal to select the highest priority address, i.e. the one that optimizes its chances of protection. For example, for a camera, it is more advantageous to substitute its address with that of a connected bulb, rather than that of another camera. In this case, the priority of the connected bulb advantageously will be higher.

According to one embodiment, the step of acquiring the status data is implemented for a determined duration starting from the detection of a message comprising an identifier of the network.

Advantageously, according to this embodiment, after receiving the network connection data, the first terminal has a limited amount of time for constructing or receiving the status data. For example, it can stop scanning the network after five minutes. If, at the end of this period, it has not detected any active terminal, or has not received any set of status data from the third terminal (access point), it can then connect with its own address, or restart a monitoring step, or waive the connection, etc.

According to one embodiment, the method further comprises, after the step of connecting to the network, a step of disconnecting following the reception of a message from or to said at least one second terminal.

Advantageously, according to this embodiment, when a message from or to the second terminal is intercepted by the first terminal, this means that the second terminal whose address it has usurped wishes to reconnect, or is already reconnected, and that it must therefore disconnect so as not to prevent it from communicating.

Correspondingly, the aim of n exemplary embodiment of the present disclosure is a device for securely connecting a first terminal of a network administered by an access point, the terminal comprising a first address, called own address, the device being characterized in that it is configured to implement:

acquiring a set of data, called status data, comprising at least one address of at least one second terminal known to the network;

connecting to the network using said address of said second terminal as a replacement for the own address.

A further aim of an exemplary embodiment of the present disclosure is a method for providing a set of status data implemented by an access point of a network, the method comprising steps of:

preparing a set of data, called status data, comprising at least one address of at least one terminal known to the access point and not connected;

transmitting said set of data over the network.

Correspondingly, a further aim of an exemplary embodiment of the present disclosure is a device for providing a set of status data of an access point of a network, the device being characterized in that it is configured to implement:

preparing a set of data, called status data, comprising at least one address of at least one terminal known to the access point and not connected;

transmitting said set of data over the network.

The features and advantages of the secure connection method according to an exemplary embodiment are similarly applied to the secure connection device according to an exemplary embodiment, and vice versa.

The features and advantages of the method for providing a set of status data according to an exemplary embodiment are similarly applied to the device for providing a set of status data according to an exemplary embodiment, and vice versa.

A further aim of an exemplary embodiment is a communication system of a local area network administered by an access point for securely connecting a first terminal to the local area network, the system comprising:

on the first terminal, a secure connection device as described above;

on the access point, a device for providing a set of status data as described above.

A further aim of an exemplary embodiment is a computer program on a recording medium, with this program being able to be implemented in a secure connection computer, or in a secure connection device according to an exemplary embodiment, and a computer program on a recording medium, with this program being able to be implemented in a computer, or in a device according to an exemplary embodiment, for providing status data. These programs include instructions suitable for implementing the corresponding methods.

These programs can use any programming language, and can be in the form of source code, object code, or of intermediate code between source code and object code, such as in a partially compiled format, or in any other desirable format.

A further aim of an exemplary embodiment is a computer-readable information medium or a computer-readable recording medium comprising the instructions of one of the aforementioned computer programs.

The information or recording media can be any entity or device capable of storing the programs. For example, the media can comprise a storage means, such as a Read Only Memory (ROM), for example a Compact Disc ROM (CD-ROM) or a microelectronic circuit ROM, or even a magnetic recording means, for example a floppy disk or a hard disk, or a flash memory.

Moreover, the information or recording media can be transmissible media such as an electrical or optical signal, which can be routed via an electrical or optical cable, via a radio link, via a wireless optical link or via other means.

The programs according to an exemplary embodiment particularly can be downloaded over a network of the Internet type.

Alternatively, each information or recording medium can be an integrated circuit, in which the program is incorporated, with the circuit being adapted to execute or to be used to execute a method according to an exemplary embodiment.

BRIEF DESCRIPTION OF THE DRAWINGS

Further features and advantages will become apparent from the following description, with reference to the accompanying drawings, which illustrate non-limiting embodiments of the disclosure and in which.

DETAILED DESCRIPTION OF ILLUSTRATIVE EMBODIMENTS

Figure 1:
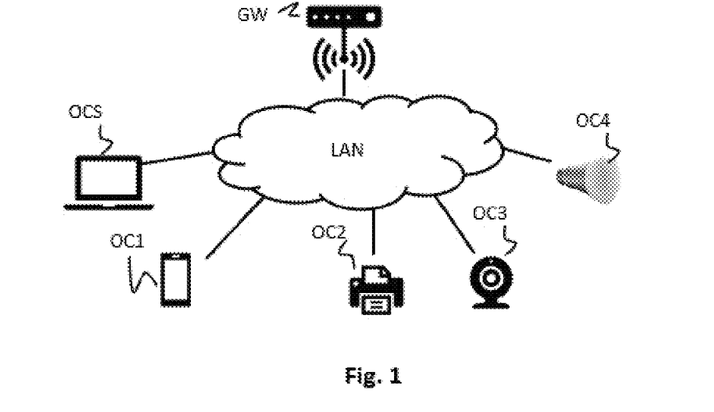
FIG. 1 illustrates an architecture of a communications network in which a proposed secure connection system can be implemented.

FIG. 1 illustrates an architecture of a communications network in which a proposed secure connection system can be implemented. According to this particular example, the secure connection method and device are located on the terminal OC3. According to one embodiment, the method and the device for providing status data can be located on the gateway GW.

The local area network (LAN) is an IP (Internet Protocol) local area network, for example. According to this example, the network (LAN) comprises a network management element (GW), called "access point" or "service gateway" or more simply "gateway" hereafter, and terminal equipment (OCi) connected to this local area network that is capable of establishing mutual communications via the gateway. The gateway also can be broadly considered to be a terminal of the local area network. It is, for example, a home gateway known commercially as a "Livebox". It comprises a Wi-Fi communication function, or access point, that allows it to communicate with the terminals of the wireless network. Alternatively, the router equipment could be a smart router, a hub, etc. According to one embodiment, the gateway further comprises a communication module for receiving messages broadcast over a short-range radio channel, such as Bluetooth, Zigbee (*Institute of Electrical and Electronics Engineers* (IEEE) 802.15.4), Z-Wave, DECT (Digital Enhanced Cordless Telecommunications) and/or DECT ULE (DECT Ultra Low Energy), etc. By way of a reminder, Bluetooth is a short-range network technology used to link devices together without a wired connection. Bluetooth allows data or voice to be transmitted between terminals equipped with radio modules, over a radius, or range, of the order of ten meters to slightly less than one hundred meters. For its part, the term Wi-Fi covers a set of standards of the IEEE 802.11 specification for wireless communications that can range up to a few hundred meters.

Within the context of Wi-Fi, in order to connect to the gateway, a terminal must be paired using a pairing mechanism that is well known to a person skilled in the art, which comprises the following steps in accordance with the 802.11 specification:

A probe step, during which the terminal broadcasts an analysis request frame (PROBE_REQUEST) and the access point within range responds with a probe response frame (PROBE_RESPONSE);

An authentication step, during which the terminal broadcasts an authentication request frame (AUTHENTICATION_REQUEST) and the access point within range responds with an authentication response frame (AUTHENTICATION_RESPONSE);

An association step, during which the terminal broadcasts an association request frame (ASSOCIATION_REQUEST) to the access point and the access point within range responds with an association response frame (ASSOCIATION_RESPONSE);

If the protocol requires encrypted authentication of the terminal, a step of exchanging network access keys, such as a WEP ("Wired Equivalent Privacy") or WPA ("Wi-Fi Protected Access") or PSK ("Pre-Shared Key") key, with the gateway GW. The password can be entered on the terminals manually by a user, or can be supplied automatically.

By way of a reminder, on a Wi-Fi type local area network, messages are exchanged in broadcast mode. Thus, a message transmitted by a terminal over the network is received by all the other terminals. A terminal can read a certain amount of basic information in such a message, notably such as the physical addresses (notably the MAC address) of the terminals. However, if the communication is secure, a terminal can only decipher the high-level information in such a message if it is registered (connected, paired) on the network by the gateway GW.

In addition to the gateway GW, the network LAN shown comprises terminals OC1, OC2, OC3 and OC4. In the example described herein, the terminal OC1 is a smartphone, the terminal OC2 is a printer, the terminal OC3 is a camera and the terminal OC4 is a connected bulb. They are able to communicate over the local area network via the gateway GW using Wi-Fi and/or Bluetooth standards.

The example also comprises a device OCS capable of setting itself as a passive or active spy on the local area network. Passive spying involves intercepting the exchanges of messages between the various terminals. Active spying involves transmitting legitimate and illegitimate frames (for example, with the aim of disconnecting legitimate equipment). In the example described herein, the device OCS is a laptop.

Each of the terminals OCi of the local area network comprises at least one identifier MACi allowing the gateway to unequivocally identify it in the local area network. This notably can be its MAC (Media Access Control) address. The native MAC address of the terminal is a physical identifier stored in an interface of the equipment, for example its network card. Unless it has been modified by the terminal user, it is unique. This is the MAC address referred to hereafter as the "manufacturer" or "native" MAC address. Its format is standardized. In the most common format, a MAC address is made up of 48 bits (6 bytes) and is generally represented in hexadecimal form, separating the bytes with a colon. For example, 5E:FF:56:A2:AF:15. It notably includes an "O.U.I" (Organizationally Unique Identifier) type of data that is a 24-bit number assigned by the IEEE (Institute of Electrical and Electronics Engineers). This number uniquely identifies a manufacturer or organization in a MAC address. Thus, it is possible, based on the MAC address of the camera manufacturer, to recognize a "Camera" type terminal of a manufacturer specializing in the production of cameras. The MAC address of a terminal can be modified by the user. Hereafter, this modified address will be called user MAC address.

According to an alternative embodiment, the terminal identifier can be an IP address, or a UUID (Universally Unique Identifier), for example in the case of a Bluetooth protocol, or an IMSI (International Mobile Subscriber Identity), or an IPUI (International Portable User Identity, which is a unique identifier of the object within the context of the DECT-ULE standard), etc.

In the example shown, the terminal OC3 wishes to connect to the network LAN. To this end, it acquires the network name (SSID) and password. An exemplary embodiment of the disclosure proposes that it then starts communicating over the network, not with its own MAC address (whether it is the "manufacturer" or "native" address), but with the MAC address borrowed from another item of equipment on the network, for example OC2, if this equipment is not communicating over the network. This mechanism has a twofold advantage: the attacker OCS will find it more difficult to seize the MAC address of OC3, since it is variable over time (they can successively borrow the MAC address of OC2, then that of OC1, etc.) and, moreover, no longer corresponds to the supposed MAC address of a camera (since in this example the address is borrowed from a printer).

Figure 2:
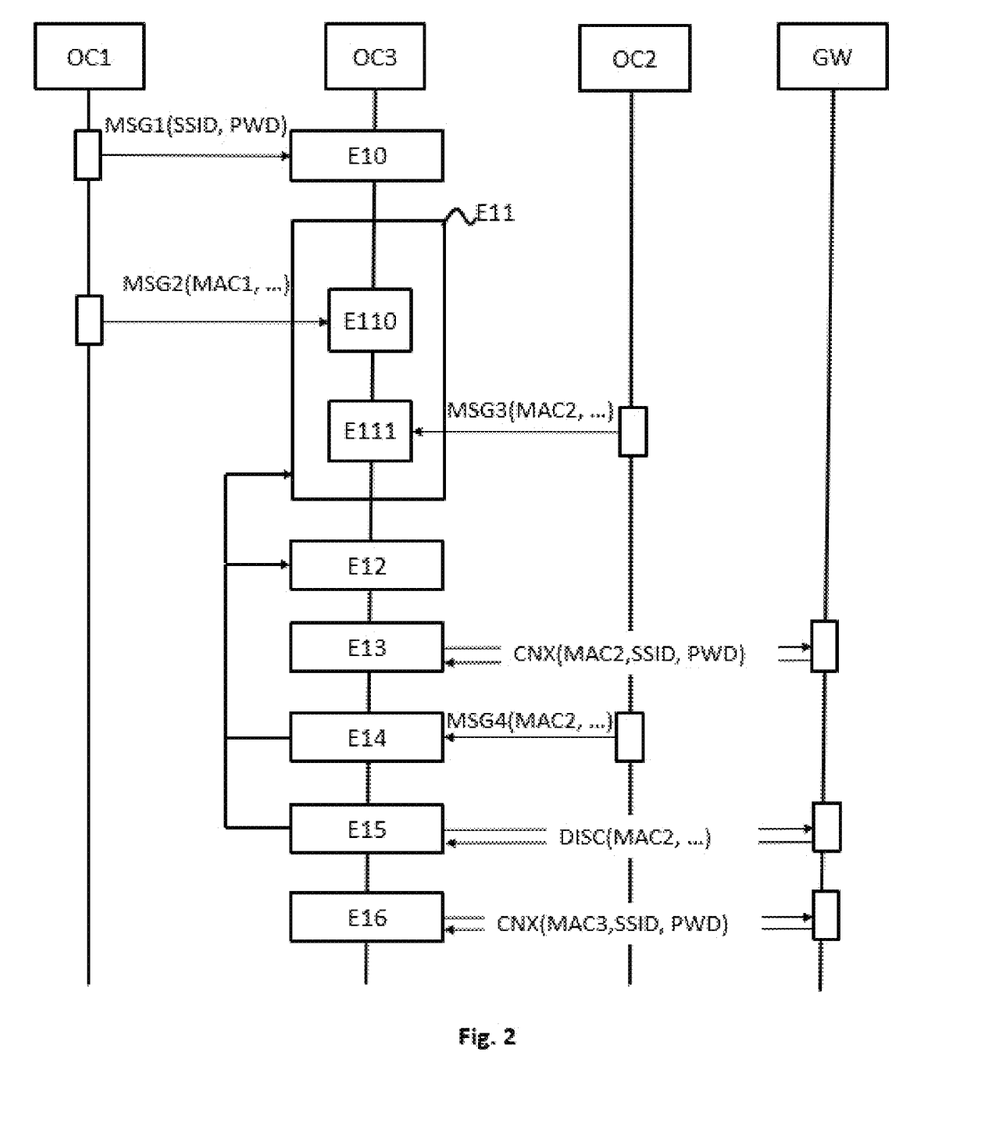
FIG. 2 is a flow chart representing the steps of a proposed secure connection method, implemented according to a particular embodiment.

FIG. 2 is a flow chart representing the steps of a secure connection method implemented according to a particular embodiment of the disclosure by the secure connection system described with reference to FIG. 1. According to this embodiment, the connection device and the connection method are on the terminal OC3.

During a step E10, the terminal OC3 receives the name of the Wi-Fi network, or SSID (for example, Livebox-IoT) and the associated Wi-Fi key. According to the example described, it receives this information from the smartphone OC1. According to another example, it can carry out conventional pre-pairing by exchanging messages with the gateway GW in order to retrieve the SSID.

Before connecting to the Wi-Fi network, the equipment OC3 enters monitoring mode, during a step E11. In this mode, it detects all the terminals connected to the Wi-Fi network and, for each of them, stores an address, in this example the MAC address, whether this is of the manufacturer or user type, in order to construct a table in a memory, called set of status data, or status table. To this end, it analyzes all the messages broadcast over the local area network. According to the example in FIG. 2:

During a sub-step E110, the terminal OC3 intercepts a message originating from the terminal OC1 (the smartphone). It stores its MAC address, MAC1;

During a sub-step E111, the terminal OC3 intercepts a message originating from the terminal OC2 (the printer). It stores s MAC address, MAC2.

Optionally, the method also stores, upon receipt of a message, the date of the intercepted packet.

Optionally, the method deduces therefrom the manufacturer of the terminal (by way of a reminder, the first three bytes of an original MAC address include the manufacturer reference). According to the example, the first MAC address corresponds to that of a smartphone manufacturer, denoted COI; the second MAC address corresponds to that of a printer manufacturer, denoted COL For example, the proposed device can store identifiers of the D-Link and Awox (registered trademarks) manufacturers that market connected objects. According to another example, in the case of a Bluetooth link, a UUID identifier also can be determined from a field of a "Bluetooth advertising" type packet transmitted by the terminal. The name or a prefix of the name can be determined from a Bluetooth identifier of the "org.bluetooth.characteristic.gap.device_name" type or from a number assigned according to the Bluetooth specification, of the "0x2a00" type.

Optionally, the method deduces therefrom a type of terminal. For example, for a given manufacturer, it can be known that the addresses in a first range correspond to televisions, and that the addresses in a second range correspond to smartphones.

Optionally, the method deduces therefrom a priority: it can, for example, assign a higher priority to addresses that correspond to a manufacturer of temperature sensors, or printers, etc. According to the example, a priority 3 (higher) is assigned to the printer manufacturer and a priority 1 (lower) is assigned to the smartphone manufacturers. This means that the terminal OC3 will prefer to borrow the address of a printer rather than that of a smartphone.

According to one embodiment, step E11 is completed after a set period of time starting from the reception of the connection identifiers. According to another embodiment, step E11 is completed when a MAC address with a given priority has been detected. According to yet another embodiment, step E11 is completed when the user decides to do so (for example, by pressing a button that triggers pairing). On completion of step E11, the device has a table, called status table, in the memory that contains the status data, as shown below:

TABLE 1

| @MAC | YES | PRIO | Date of first packet | Date of last packet | Status |
| --- | --- | --- | --- | --- | --- |
| MAC1 | SMART_COI | 1 | April 7 08:57 | April 7 08:57 | Connected |
| MAC2 | IMPR_COJ | 3 | April 7 08:58 | April 7 08:58 | Connected |

It should be noted that, on completion of this step, in this embodiment, all the registered terminals are necessarily connected since a message originating from them or intended for them, including their MAC address, has been received by OC3.

If no equipment is detected on completion of step E11, then the terminal OC3 can connect with its real address, or, according to an alternative embodiment, can waive connecting for a predefined period, or, according to another alternative embodiment, can return to the start of step E11, or can even issue the user a warning message, or any other alternative embodiment within the scope of a person skilled in the art. Step E11 can continue as a background task to update the status table.

During a step E12, the terminal OC3 waits for one of the detected terminals to disconnect. According to one embodiment, a terminal is considered to be disconnected if the terminal OC3 no longer detects packets relating to it (bearing its address) for a predetermined time (for example, 20 seconds). According to one embodiment, a terminal is considered to be disconnected if an intercepted packet corresponds to a disconnection message. On completion of step E12, according to the example shown, OC3 has detected the disconnection of the equipment OC2 (the printer has not been communicating since the previous day, April 7). The method modifies the status table in the memory. It is also assumed that step E11 has continued to run as a background task, that the bulb OC4 has connected, and that it has a higher priority (5). The device has the following table:

TABLE 2

| @MAC | YES | PRIO | Date of first packet | Date of last packet | Status |
|------|-----|------|---------------------|---------------------|--------|
| MAC1 | SMART_COI | 1 | April 7 08:57 | April 8 02:02 | Connected |
| MAC2 | IMPR_COJ | 3 | April 7 08:58 | April 7 08:58 | Disconnected |
| MAC4 | AMP_COK | 5 | April 8 06:58 | April 8 06:59 | Connected |

According to one embodiment, step E12 is time-limited (for example, to 3 minutes). If no terminal disconnects within this time interval, then the terminal OC3 can connect with its real address, or, according to an alternative embodiment, can waive connecting for a predefined period, or, according to another alternative embodiment, can return to the start of step E11, or even issue the user a warning message.

According to another embodiment, which will be described with reference to FIG. 3, steps E11 and E12 are replaced by a step in which all the status data is provided partially (for example, a list of MAC addresses is provided) or in full (for example, a list of MAC addresses is provided in association with a manufacturer and a priority) by a third-party terminal of the network. According to one embodiment, this is the gateway (GW).

According to an alternative embodiment, only step E11 involving retrieving the list of network equipment is replaced by a step in which this list is supplied by a third-party terminal of the network.

During step E13, the terminal OC3 connects to the Wi-Fi network using the MAC address of the terminal that has disconnected, in this example the address MAC2 of the printer OC2. It should be noted that the terminal OC3, which in this example is a camera, uses the MAC address of a printer in this case. If the MAC address is that of the printer manufacturer (native address), OC3 uses the MAC address of a printer manufacturer. Thus, a pirate terminal such as OCS observing its MAC address will not detect that it is a camera, which will therefore prevent any targeted attack on a camera-type device (deactivation, modification of the camera parameters, image capture, etc.).

The terminal OC3 is then connected to the local area network with the borrowed address and communicates with the gateway and the other terminals over this address. It can decrypt messages once the gateway has authenticated it.

When the terminal OC2, which is the legitimate owner of the address MAC2, attempts to reconnect, it sends an authentication and/or connection request message to the gateway GW, for example a PROBE_REQUEST or AUTHENTICATION/ASSOCIATION_REQUEST type message, as described above. The gateway responds by sending a response message (for example, PROBE RESPONSE or AUTHENTICATION/ASSOCIATION RESPONSE) to the terminal attempting to reconnect, notably using its MAC address, MAC2. The terminal OC3 receives (intercepts) one of these messages, denoted MSG4, during a step E14, analyzes it and establishes that the address MAC2 is the one that it borrowed from OC2.

The equipment OC3 disconnects during a step E15 so as not to disrupt the "legitimate" terminal. To this end, it can transmit a de-authentication or disassociation frame in accordance with the aforementioned 802.11 standard.

According to one embodiment, the terminal OC3 disconnects itself after a certain period of time, for example 5 minutes. In this case, step 14 can be omitted.

The connection method on OC3 then attempts to determine, from its table, whether there is a new MAC address that it can use (i.e. the MAC address of an item of equipment that is not currently connected). To this end, it can return to step E12 to analyze the status table available to it in the memory. Alternatively, it can also restart step E11 in order to detect new devices on the local area network and wait for one of them to be disconnected during step E12. It should be noted that the steps are not necessarily sequential, and that, for this reason, the step E11 of searching for and building the status table can continue during steps E12-E15, for example as a background task.

It should be noted that embodiments of the disclosure are not limited to Wi-Fi but can also relate to other radio protocols such as Bluetooth Low Energy or ZigBee. The principle remains the same, but the frames are different.

Figure 3:
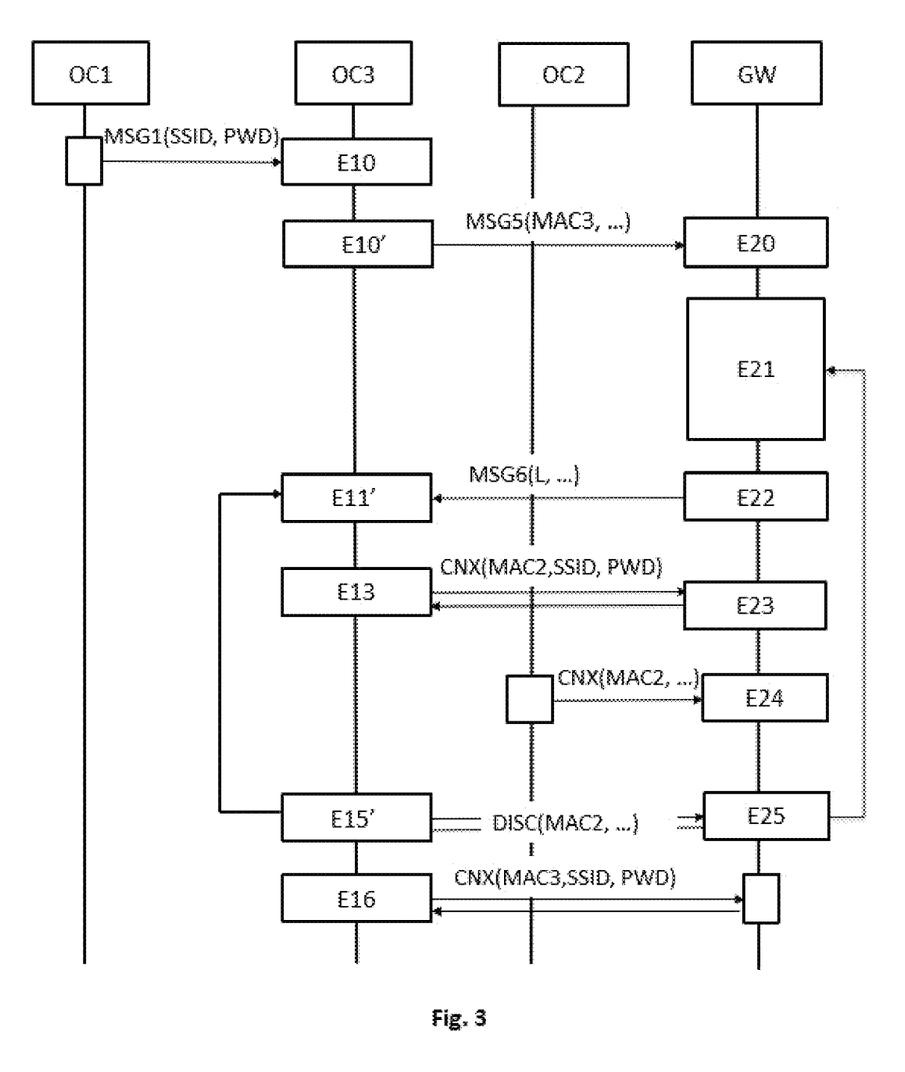
FIG. 3 is a flow chart representing the steps of a proposed secure connection method, implemented according to another particular embodiment.

FIG. 3 is a flow chart representing the steps of a secure connection method implemented according to another particular embodiment by the secure connection system described with reference to FIG. 1, on the terminal OC3, in association with a method and a device for supplying addresses on the home gateway GW.

According to this embodiment, it is the gateway GW that manages the status table and broadcasts it to the network terminals. Indeed, it is well known that a home gateway permanently maintains a table of the terminals connected to it; thus, the gateway can simply consult the memory for the table of terminals connected to it, which table is updated each time a terminal connection/disconnection packet is received, and can easily prepare a status table corresponding to the status tables shown in support of FIG. 2. It can also simply transmit a list of addresses of inactive terminals of the network. According to this embodiment:

Step E10 is similar to step E10 of FIG. 2.

During a step E10', the terminal OC3 transmits a secure connection request message to the gateway GW. This message, denoted MSG5, can correspond to an existing message of the protocol that is used, for example a "PROBE REQUEST" message according to the 802.11 Wi-Fi standard, or to a new message, for example "PROBE CLIENTS".

The request is received by the gateway during a step E20.

During a step E21, the gateway prepares a list L of terminals for the terminal OC3. According to one embodiment, it prepares a generic list of terminals for all the terminals of the network, comprising all or a subset of the terminals of the network, preferably inactive terminals (i.e., which are disconnected or have not been communicating for a given period of time). According to another embodiment, it prepares a list of all the terminals, whether they are connected or disconnected. The gateway necessarily knows all the terminals connected to and disconnected from the Wi-Fi network and has already stored an address for each of them, in this example the MAC address (MAC1, MAC2, MAC3), irrespective of manufacturer or user type. At step E22, it prepares a message MSG6 containing this list L of addresses of the terminals, and optionally their manufacturer, type, priority, etc. According to another embodiment, the list of terminals is specific to a terminal. If the gateway detects that OC3 is a camera, it can, for example, omit to transmit the list of cameras, but send it the addresses of the terminals that differ from them (for example, printers and bulbs connected to the network) and that will allow OC3 to be "hidden" as well as possible when it borrows their address.

During a step E11', the terminal OC3 receives the list L from the gateway GW, in a message denoted MSG6. It stores the list and/or uses its information to construct a table in the memory, called set of status data or status table, similar, for example, to table 2 shown in support of FIG. 2.

The MSG6 message can correspond to an existing message of the protocol that is used, for example, according to the 802.11 Wi-Fi standard, a "PROBE_RESPONSE" message, the fields of which have been adapted for transmitting the list of network terminals, or to a new message (PROBE CLIENTS RESPONSE).

The various options presented in support of FIG. 2 remain valid: the terminal OC3 can receive from the gateway, or deduce from the addresses received, a manufacturer of a terminal, its type, its priority, etc.

According to one embodiment, the following steps E12-E16 can be identical to those presented in support of FIG. 2, particularly if the gateway transmits the list of all the terminals, whether they are connected or disconnected.

According to another embodiment, as shown in FIG. 3, step E12 is omitted, because the gateway has only transmitted the list of terminals that are inactive, so there is no need to wait for one of them to be disconnected; step E11' is directly followed by step E13 (the terminal OC3 connects to the Wi-Fi network, step E23), after the connection method on OC3 has selected an address (for example, the first in the list, or the one with the highest priority) from the received list. Step E14 is replaced by a step E24 on the gateway, which receives and processes the connection from the terminal OC2 whose address, MAC2, has been borrowed; during a step E25, the gateway disconnects the terminal OC3, which receives the disconnection information during a step E15'. Step E16 remains unchanged.

According to another embodiment, the gateway is replaced by another terminal, for example the terminal OC1 that transmitted the SSID and the Wi-Fi key during step E10.

Figure 4:
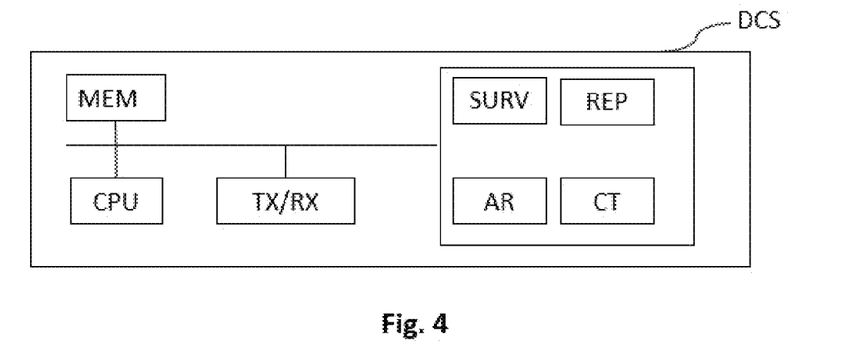
FIG. 4 illustrates a functional architecture of a secure connection device.

FIG. 4 shows a functional architecture of a secure connection device DCS.

According to the embodiment proposed in FIGS. 2 and 3, it is installed on the terminal (OC3) that wishes to benefit from a secure connection. It comprises modules for securely connecting to the local area network by borrowing a MAC address from one of the inactive terminals of the local area network.

In the embodiments described herein, the device DCS has the hardware architecture of a computer. Its hardware architecture notably comprises a processor CPU, a random-access memory and a read-only memory grouped together in a module MEM, optionally a non-volatile flash memory in a particular embodiment of the disclosure, as well as communication means TX/RX for transmitting and receiving messages depending on the type of network targeted by the embodiment (Wi-Fi, Bluetooth, etc.). Such means are known per se and are not described in greater detail herein.

The random-access memory of the device is used to store variables used for executing the steps of the connection method according to an exemplary embodiment, such as the MAC addresses, the passwords, the identifiers, the status table, etc.

The read-only memory of the device forms a recording medium according to an exemplary embodiment, which can be read by the processor and on which a computer program PROG according to an exemplary embodiment is recorded. The computer program PROG defines functional and software modules configured to ensure a secure connection. These functional modules are based on and/or control the hardware elements of the device.

In some embodiments, the connection device also comprises:

- an analysis module SURV configured to analyze the messages received by the device and to extract the MAC address of the network terminals;
- a module REP for replacing the MAC address of the current device, or its own address, with that borrowed from another device of the network;
- a module CT for constructing or storing and updating the status table comprising the list of MAC addresses and the status (connected or disconnected) and optionally the type, the priority, etc., associated with the network terminals;
- a module AR for analyzing waking-up of the terminal whose address it has borrowed, so as to disconnect in order to free-up the borrowed MAC address.

Figure 5:
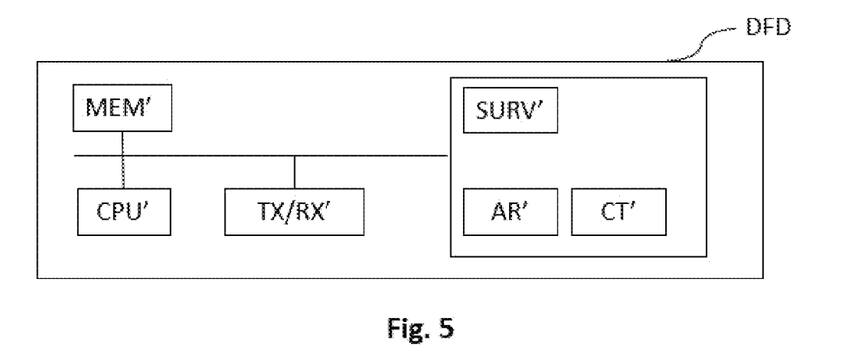
FIG. 5 illustrates a functional architecture of a device for providing status data.

FIG. 5 shows a functional architecture of a device for providing a set of status data DFD.

According to the embodiment proposed in FIG. 3, it is installed on the gateway GW that administers the local area network (LAN). It comprises modules for providing a terminal of the local area network with a set of status data containing MAC addresses of network terminals that can be borrowed for a temporary connection.

In the embodiments described herein, the device DFD has the hardware architecture of a computer. Its hardware architecture notably comprises a processor CPU', a random-access memory and a read-only memory grouped together in a module MEM', optionally a non-volatile flash memory in a particular embodiment of the disclosure, as well as communication means TX/RX' for transmitting and receiving messages depending on the type of network targeted by the embodiment (Wi-Fi, Bluetooth, etc.). Such means are known per se and are not described in greater detail herein.

The random-access memory of the device is used to store variables used for executing the steps of the method for providing status data according to an exemplary embodiment, such as the MAC addresses, the passwords, the identifiers, a list (L) of terminals, etc.

The read-only memory of the device forms a recording medium according to the an exemplary embodiment, which can be read by the processor and on which, in this case, a computer program PROG' according to an exemplary embodiment is recorded.

The computer program PROG' defines functional and software modules that in this case are configured to build and to distribute a list (L) of terminals and their associated addresses. These functional modules are based on and/or control the hardware elements of the device.

In other embodiments, the device DFD also comprises:
- an analysis module SURV' configured to analyze the messages received by the device and to extract the MAC address of the network terminals communicating with the device (in this case, with the gateway). It should be noted that this module already exists on all the access points;
- a module CT' for building or storing and updating the list (L) of terminals to be broadcast over the network, including their MAC addresses and optionally the associated type, priority, etc.;
- a module AR' for analyzing waking-up of a terminal whose address has been borrowed, in order to disconnect the borrowing terminal in order to free-up the borrowed MAC address.

Although the present disclosure has been described with reference to one or more examples, workers skilled in the art will recognize that changes may be made in form and detail without departing from the scope of the disclosure and/or the appended claims.

The invention claimed is:

1. A secure connection method implemented by a first terminal of a network administered by an access point, the first terminal comprising a type, called an "actual type", and a first address, called own address, the method comprising:
   acquiring a set of data, called status data, comprising at least an address of a second terminal known to the network;
   inferring, for said second terminal, a type of the second terminal; and
   connecting to the network using the address of said second terminal of which the type does not correspond to the actual type of the first terminal.

2. The method according to claim 1, wherein acquiring the status data comprises:
   receiving a message from or to said second terminal of the network comprising said address; and
   storing said address of said second terminal in the status data,
   and the method further comprises detecting inactivity of said second terminal before the connecting.

3. The method according to claim 2, wherein the status data further comprises a reception date of the message originating from or to said second terminal, and the inactivity of said second terminal is detected as a function of said reception date.

4. The method according to claim 1, wherein acquiring the status data comprises:
   receiving a message comprising status data originating from a third terminal of the network.

5. The method according to claim 1, wherein the status data further comprises a priority associated with said address of said second terminal.

6. The method according to claim 1, wherein acquiring the status data is implemented for a determined duration starting from detection of a message comprising an identifier of the network.

7. The method according to claim 1, further comprising, after connecting to the network:
   disconnecting following reception of a message from or to said second terminal.

8. A device for securely connecting a first terminal of a network administered by an access point, the first terminal comprising a type, called an "actual type", and a first address, called own address, the device comprising:
   a processor; and
   a non-transitory computer readable medium comprising instructions stored thereon which when executed by the processor configure the device to implement:
   acquiring a set of data, called status data, comprising at least an address of a second terminal known to the network;
   inferring, for said second terminal, a type of the second terminal; and
   connecting to the network using the address of said second terminal of which the type does not correspond to the actual type of the first terminal.

9. A non-transitory computer readable medium comprising a computer program stored thereon comprising instructions for executing a secure connection method when said program is executed by at least one processor of a first terminal of a network administered by an access point, the first terminal comprising a type, called an "actual type", and a first address, called own address, the method comprising:
   acquiring a set of data, called status data, comprising at least an address of a second terminal known to the network;
   inferring, for said second terminal, a type of the second terminal; and
   connecting to the network using the address of said second terminal of which the type does not correspond to the actual type of the first terminal.

* * * * *